United States Patent [19]

Walter et al.

[11] 4,198,559
[45] Apr. 15, 1980

[54] HEAT RETAINING APPLIANCE

[75] Inventors: Henry J. Walter, Wilton; Raymond W. Kunz, Monroe, both of Conn.

[73] Assignee: Clairol Incorporated, New York, N.Y.

[21] Appl. No.: 862,310

[22] Filed: Dec. 20, 1977

[51] Int. Cl.² .............................................. H05B 1/02
[52] U.S. Cl. .................. 219/387; 126/273.5; 165/104 S; 219/430
[58] Field of Search ......................... 219/385–387, 219/438, 439, 430; 126/400, 273.5, 375; 165/104 S, 105

[56] References Cited

U.S. PATENT DOCUMENTS

| | | | |
|---|---|---|---|
| 3,038,058 | 6/1962 | Gordon, Jr. | 219/439 |
| 3,148,676 | 9/1964 | Truog et al. | 126/246 |
| 3,381,115 | 4/1968 | Welch | 219/387 |
| 3,610,884 | 10/1971 | Evans | 219/386 |
| 3,780,262 | 12/1973 | Rudd | 165/104 S |
| 3,805,018 | 4/1974 | Luong et al. | 219/439 |
| 3,842,242 | 10/1974 | Chisholm | 219/385 |
| 3,875,370 | 4/1975 | Williams | 219/386 |
| 4,009,368 | 2/1977 | Faivre et al. | 219/430 |

Primary Examiner—B. A. Reynolds
Assistant Examiner—Bernard Roskoski
Attorney, Agent, or Firm—Gerald S. Rosen; George A. Mentis; David J. Mugford

[57] ABSTRACT

An appliance is provided which is capable of transmitting heat retained therein to cooked food placed in the appliance, so that the food can be kept hot when an electrical cord used for initially causing the appliance to be electrically heated is disconnected therefrom. The appliance includes an outer casing and a removable cover, both of which are made of materials that retard heat loss from the appliance, preferably non-metallic materials. It further includes a housing enclosed by the casing and cover and made of a non-metallic material, such as plastic, in which a non-metallic heat retaining material, such as wax, is confined. Disposed throughout the heat retaining material is a resistance heater, which is removably connected to the electrical cord for melting the material, so that the heat of fusion of the melted material may be transmitted into the food to reduce its cooling rate after the heater is disconnected from the cord.

25 Claims, 2 Drawing Figures

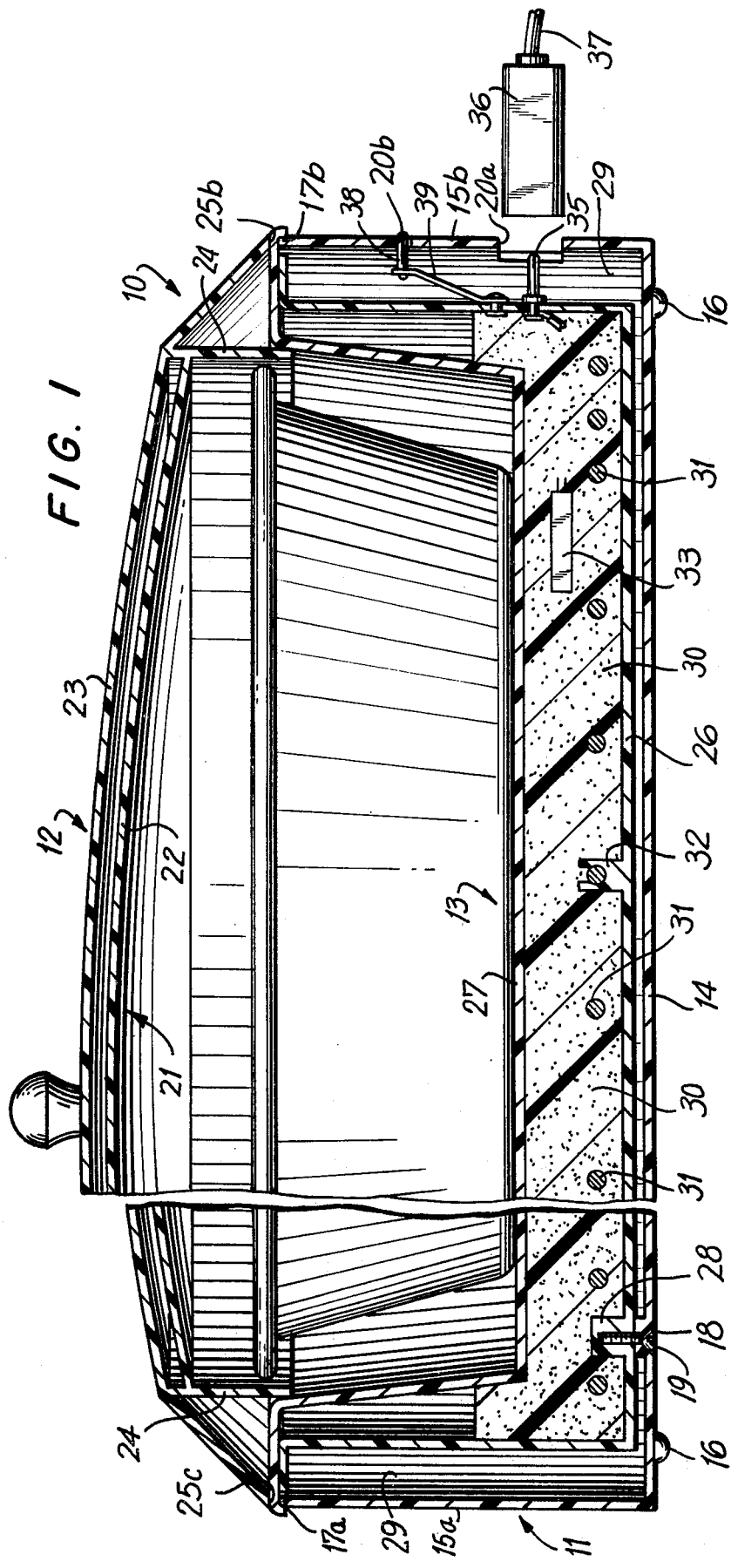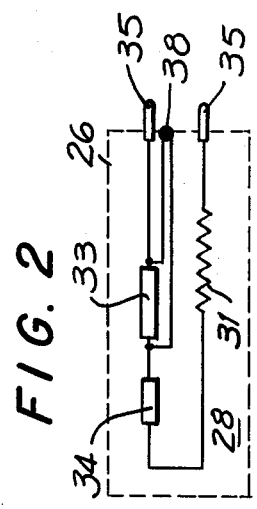

HEAT RETAINING APPLIANCE

BACKGROUND OF THE INVENTION

This invention relates to a heat retaining appliance. More particularly, it relates to an appliance which is only initially electrically heated, retains its heat for a reasonable time, and slowly transmits this retained heat to food placed therein. This is desirable for heating the food, which "heating" shall mean herein elevating the temperature of a product and/or reducing the cool off rate of the product as much as possible. The latter eliminates the necessity for continued electrical heating of the food to maintain it at an elevated temperature.

Problems are encountered when food is served at a distance, either in time or space, from the place of its original preparation. This occurs when a meal is prepared in a central kitchen, but is served away from the kitchen sometime well after its preparation. To keep hot food hot, it has been known in the past to place the food in a container, such as a casserole, equipped with heating elements and an electrical cord for delivering electrical energy into the elements. However, the capability of moving such a container is restricted because it must be connected by the cord to a wall socket to keep the food hot. Thus, a "cordless" serving appliance is preferred.

Heat retaining appliances of this type are disclosed in U.S. Pat. Nos. 4,009,368; 3,937,209; 3,875,370; 3,720,198; 3,603,106; 3,463,140; 3,389,946; 3,148,676; and 2,640,478. Problems have arisen in connection with such appliances, particularly those that have a heat retaining material confined within a metal jacket, which may or may not be insulated and/or further encased by an outer plastic shell. It has been found that the rate of exchange or transfer of heat from the heat retaining material, through the metal jacket, and into the food heating area of such an appliance is too rapid. This is particularly a problem when the appliance is uncovered for serving the food because the heat being emitted from the heat retaining material is more apt to be lost to the environment.

Therefore, it is an object of the present invention to provide a heat retaining appliance which may initially be connected to an electrical energy source to be heated, but may then be disconnected therefrom, while still retaining heat for a reasonable time.

It is another object of the present invention to provide a heat retaining appliance having a mass of heat storing material enclosed within a casing shaped to receive a food-containing dish as well as a removable cover, the latter of which functions not only to protect food placed on the dish against contamination, but also to insulate the food and the appliance against loss of heat to the atmosphere, while maintaining the food hot for as long as possible.

It is another object of the present invention to provide a heat retaining appliance at least partially made of materials which exhibit heat transfer properties similar to that of plastic, so that effective heat transmission to the interior of the appliance is maximized while heat loss from the appliance is minimized.

It is still another object of the invention to provide a heat retaining appliance in which a substantially nonmetallic heat retaining material is confined within a substantially non-metallic housing and an insulating casing encloses the housing to retard heat loss from the appliance.

SUMMARY OF THE INVENTION

In accordance with this invention, a heat retaining appliance is provided. The appliance includes a housing formed essentially by a substantially non-metallic liner adapted to receive a product to be heated and a tray secured to the liner. Confined within the housing is a substantially non-metallic heat retaining material. Disposed in the housing for heating the material is a heater, which is removably connected to heater activating means, so that after the heater is activated and the means are removed, the product is heated by the introduction therein through the housing of the heat of fusion of the material.

At least the liner of the housing, through which the heat of fusion of the material passes into the product, has a rate of heat transfer between about 5 and about 85 B.T.U./sq. ft./hr./°F. Preferably, the rate of heat transfer through the material of which the liner is made is between about 0.75 and about 5.0 B.T.U./sq. ft/hr./°F./in. and the thickness of the liner is between about 0.06 and about 0.15 in.

In a preferred embodiment of an appliance of this invention, the heat retaining material, such as a parrafin wax, has a melting point between about 170° and about 210° F., the heater is disposed in the heat retaining material, and the appliance further includes a removable cover and a casing which enclose the housing.

The appliance of this invention is best understood by reference to the description of the preferred embodiments thereof provided below and the drawings herein which are as follows:

BRIEF DESCRIPTION OF THE DRAWINGS

FIG. 1 is a partially broken-away cross sectional view of a heat retaining appliance of this invention.

FIG. 2 is a schematic illustration of the electrical components of the appliance of FIG. 1.

DETAILED DESCRIPTION OF THE PREFERRED EMBODIMENTS

A heat retaining appliance of the present invention is generally indicated at 10 in FIG. 1. The appliance includes an outer casing 11, a cover 12, and a housing 13 enclosed therebetween.

Casing 11 has a base 14 and four sides, sides 15a and b being shown. Although the appliance could be placed directly on a surface during use, support feet 16 are provided on base 14 for this purpose. Free edges 17a and b of sides 15a and b abut the housing and are secured thereto, preferably in the manner described below with reference to the securing together of the components of housing 13. Several openings are provided in base 14 and side 15b of casing 11. One or more blind holes 18 are provided in base 14 into which screws 19 extend for attaching casing 11 to housing 13. However, other means, such as spring clips or "heat staking", may be used for this purpose. Other openings 20a and b are provided in side 15b for the reasons discussed below. It is contemplated that the above means for attaching casing 11 to housing 13 and openings 20a or b can also be provided in either side 15a or b.

Cover 12, as shown in FIG. 1, has a downwardly curved top portion 21, which is constructed of two spaced walls 22 and 23. The air space between the walls enhances the insulative properties of the cover to retard heat loss from the appliance. The cover further includes drip lips 24, which extend from top portion 21 into the food heating area of the appliance. The lips provide a means for condensation collecting on the upper, inside surface of the cover to drain into this area. Although cover 12 could be constructed to cover just the food container shown in FIG. 1 or the food heating area of the appliance which is generally bounded by drip lips 24, the edges of cover 12, indicated at 25a and b in FIG. 1, extend outwardly to cover essentially the entire upper surface of the housing. Thus, housing 13 is essentially fully enclosed by casing 11 and cover 12 to prevent heat loss from the appliance.

Housing 13 includes a tray 26, in which the heat retaining material discussed below is maintained, and a liner 27, which covers the heat retaining material and is sealed to tray 26. Many methods of sealing may be employed, such as adhesive sealing, ultrasonic heat sealing, or mechanical clamping together of the abutting surfaces of tray 26 and liner 27. Provided in the base portion of the tray is a boss 28 in communication with each blind hole 18 in base 14 of casing 11. Screws 19 extend into blind holes 18 to attach casing 11 to housing 13. An air space 29 is provided between tray 26 and casing 11 to retard heat loss from the heat retaining material contained within the housing. It is contemplated that an insulating material, such as a foamed plastic, could be placed in space 29 to further retard heat loss from the appliance.

An important element of this invention resides in the material from which casing 11, cover 12, and particularly housing 13 are made. It is most desirable that casing 11, cover 12, and tray 26 of housing 13 minimize heat loss from the appliance and the materials from which these structures are made should effectuate this purpose. However, with respect to liner 27, one purpose thereof is to transfer heat into a cooked food placed in the appliance at a rate of heat transfer which retards the rate of heat loss from the food. Thus, the least reduction in temperature of the cooked food per unit time is desirable. It has been found that the cooling rate of, for example, heated water is increased by more than seven times when liner 27 is made of metal as when it is made of a non-metallic material. Specifically, an appliance similar to the one shown in FIG. 1 was made having a stainless steel housing 13 and another one was made having a plastic housing 13. 1100 cc. of water at 160° F. contained in a glass beaker was placed in each appliance. The water in the steel housing appliance lost 0.44° F./min. in 45 minutes while the water in the plastic housing appliance lost only 0.13° F./min. in 100 minutes.

It is theorized that the rate of heat transfer into the food heating area of the appliance through a metal liner is too rapid and does not allow a sufficient time for the heat to penetrate the food before it is lost from the appliance. Further, because of the circumstances under which this type of appliance is normally used, repeated removal of its cover to allow the food to be served will result in greater heat loss to the environment from an appliance having a metal housing as compared to one having a non-metallic housing.

To reduce heat loss from the appliance through casing 11, cover 12, and tray 26, avoid the heat transfer problem associated with a metal liner discussed above, and promote the most efficient rate of heat transfer through line 27, it is preferred that these structures be made of a non-metallic or substantially non-metallic material. The term "substantially non-metallic material" as used herein encompasses not only a totally non-metallic material, but also a combination or arrangment of layers of the same or different material, or a mixture of two or more materials, which combination, arrangement, or mixture exhibits heat transfer properties similar to that of a non-metal, such as plastic, rather than that of a metal.

For instance, each or any combination of these structures can be made from one or more non-metallic materials or from the combination of one or more non-metallic materials with one or more metallic materials, as long as the resulting structure exhibits non-metallic heat transfer properties. It should be appreciated that although a structure may be made from a mixture of materials which each have different rates of heat transfer, such as homogeneous vs. foamed plastics or plastics vs. metals, the structure may still exhibit non-metallic heat transfer properties, depending on the proportion of materials in the structure. Further, it is contemplated that the materials of which the structure is made could even be metallic, but in that event other heat transfer retarding means, such as an air space or an insulating material, would have to be used so that the structure exhibits substantially non-metallic heat transfer properties. For instance, tray 26, casing 11, and cover 12 are preferably made of a material having a rate of heat transfer below 0.75 B.T.U./sq. ft./hr./°F./in., such as a foamed plastic. They can be made of homogeneous plastics or other materials having a higher rate of heat transfer but in that event other means for retarding heat loss therethrough should be provided, such as the double, spaced walls 22 and 23 of cover 12, the insulating air space 29 between casing 12 and tray 26, and/or an insulating material in space 29.

Although it is preferred that liner 27 be made from a homogeneous or foamed plastic, whatever the material utilized, the liner should have a rate of heat transfer between about 5 and about 85 B.T.U./sq. ft./hr./°F. to be most effective in reducing the cooling off rate of food placed in the appliance. The liner can have a higher rate of heat transfer, but as this rate is increased from the last stated level to that level where the liner exhibits metallic rather than non-metallic heat transfer properties, the cooling off problem associated with a metal liner discussed above is more apt to occur.

It has been found that a good material from which liner 27 can be made is a polycarbonate available from the General Electric Company under the trademark "LEXAN". Another good material is a polyphenylene oxide available from G.E. under the trademark "NORYL". A liner 8 in.×10 in.×2 in. (deep) made of a material having a rate of heat transfer between about 1.1 and 1.5 B.T.U./sq. ft./hr./°F./in. and a thickness between about 0.08 and about 0.10 in. will have a rate of heat transfer between about 12 and about 16 B.T.U./sq. ft./hr./°F. Of course, it is within the skill of one versed in the art, in view of this disclosure, to coordinate the thickness of any material chosen for liner 27 with the rate of heat transfer of that material to make a liner having the above stated heat transfer properties. For instance, when the rate of heat transfer through the material of which liner 27 is made is between about 0.75 and about 5.0 B.T.U./sq. ft./hr./°F./in. and the thickness of the liner is between about 0.06 and about 0.15 in., the liner will have a rate of heat transfer within the range of 5 and 85 B.T.U./sq. ft./hr./°F.

Referring again to FIG. 1, the chamber formed between tray 26 and liner 27 contains a heat retaining material 30. As shown in FIG. 1, the material does not completely fill the space between tray 26 and liner 27 to allow for its expansion when heated. However, it should extend in this space above the bottom of liner 27. The heat retaining material useful in the appliance of this invention preferably has a melting point between about 170° and 210° F. Of course, if the appliance will be used to heat a product above this latter temperature, than a heat retaining material having a higher melting point could be utilized. Heat retaining materials which have been found to be particularly useful are paraffin wax, carnuba wax, and beeswax. Also, agents can be added to the material, even a small amount of metal, as long as material 30 remains substantially non-metallic (in accordance with the definition thereof above). For example, for increasing its consistency in its melted state, material 30 may include silicone dioxide of hydroxypropyl cellulose.

To melt material 30, a resistance heater 31 is disposed therein. The heater may be one of several well known types of heaters for small electrical appliances, such as a rope heater, a printed circuit heater, or an etched foil heater. These types of heaters are preferred because of their relatively high ratio of surface area to unit wattage. The elements of heater 31 are supported on heater supports 32, which are preferably integral with tray 26. Also disposed in material 30, but not in direct contact with heater 31, is a themostat 33. As shown particularly in FIG. 2, a thermal safety fuse 34 can also be interposed in the circuit, but the temperature of material 30 is controlled by thermostat 33 so tht the material is no longer heated once a predetermined temperature is reached. Referring again to FIG. 1, the circuit is completed by terminals 35a and b, which extend outwardly through housing 13 and into opening 20a in side 15b of casing 11. An electrical connector 36 having an electrical cord 37 attached thereto is insertable into opening 20a for contact with terminals 35a and b.

To operate the appliance, electrical connector 36 is plugged therein causing heater 31 to heat material 30 to a preselected temperature, preferably its melting temperature. To indicate to the user that the material has been adequately heated and that the electrical connector may be removed, a temperature indicator is provided. As shown in FIG. 1, indicator 38 may be a non-electric pin operated by a bimetallic switch 39. Switch 39 operates to project the pin through casing 11 when the preselected temperature of material 30 is attained and to retract the pin within space 29 between casing 11 and housing 13 when the temperature of the material is below such a predetermined level. Alternatively, as shown in FIG. 2, indicator 38 may be an electrical indicator, such as a neon light, which lights up when the material has been adequately heated and remains unlit when the temperature of the material is below the required level.

Once the material is heated, the food is placed in the appliance on liner 27, cover 12 is replaced, electrical connector 36 is disconnected, and the heat of fusion of material 30 penetrates liner 27 to heat the food. When indicator 38 shows that material 30 has cooled, if the food is to be further heated, connector 36 may be reconnected to the appliance to reheat the material to the predetermined temperature.

It is contemplated that alternative constructions of the appliance described above are possible. For instance, casing 11 may be made to fully enclose housing 13, thereby eliminating the need for separate cover 12. In this event, a closable opening could be provided in the casing through which the food to be heated could be inserted into housing 13. Although it may not be as efficient in retarding heat loss as the appliance of FIG. 1, an appliance of this invention could be made in which terminals 35 extend outwardly through liner 27, rather than through tray 26. In the same regard, heater 31 could be separated from material 30, such as by a layer of conductive material, could be placed adjacent a wall(s) of tray 26 rather than be surrounded by material 30, or could be wound around a support and immersed in material 30. It is believed that the most uniform heating of material 30 occurs when it surrounds the heater and the heater is disposed essentially throughout the material.

In connection with casing 11, it is contemplated that the casing may be eliminated and tray 26 be made of a material, in accordance with the discussion above, that permits tray 26 to serve the functions of the casing. Also, although casing 11 in the appliance of FIG. 1 is a separate, independent structure from tray 26, the casing can be made in the form of a layer of material applied to the tray for insulating the tray from the environment and making handling of the appliance easier.

What is claimed is:

1. A heat retaining appliance comprising:
   a housing, the housing being formed by a liner adapted to receive a product to be heated and a tray secured to the liner, the rate of heat transfer through the material of which the liner is made is between about 0.75 and about 5.0 B.T.U./sq. ft./hr./°F./in. and the thickness of the liner is between about 0.06 and about 0.15 in.;
   a substantially non-metallic heat retaining material confined within the housing;
   a heater disposed in the housing for heating the material; and
   means for activating the heater, the means being removably connected with the heater so that after the heater is activated and the means is removed, the product is heated by the introduction therein through the liner of the heat of fusion of the material.

2. The appliance of claim 1 wherein the rate of heat transfer through the material of which the liner is made is between about 1.1 and about 1.5 B.T.U./sq. ft./hr./°F./in. and the thickness of the liner is between about 0.08 and about 0.10 in.

3. The appliance of claim 1 wherein the rate of heat transfer through the liner is between about 5 and about 85 B.T.U./sq. ft./hr./°F.

4. The appliance of claim 3 wherein the rate of heat transfer through the liner is between about 12 and about 16 B.T.U./sq. ft./hr./°F.

5. The appliance of claim 3 wherein the heater is in contact with the heat retaining material.

6. The appliance of claim 3 wherein the heater is disposed in the heat retaining material.

7. The appliance of claim 6 wherein the heat retaining material has a melting point between about 170° and about 210° F.

8. The appliance of claim 7 wherein the heat retaining material is a paraffin wax.

9. The appliance of claim 8 further comprising a casing in which the housing is supported and a removable cover, the casing and cover enclosing the housing.

10. A heat retaining appliance comprising:
a housing, the housing being formed by a liner adapted to receive a product to be heated and a tray secured to the liner, the rate of heat transfer through the liner being between about 5 and about 85 B.T.U./sq. ft./hr./°F.;
a substantially non-metallic heat retaining material confined within the housing;
a heater disposed in the housing for heating the material; and
means for activating the heater, the means being removably connected with the heater so that after the heater is activated and the means is removed, the product is heated by the introduction therein through the liner of the heat of fusion of the material.

11. The appliance of claim 10 wherein the rate of heat transfer through the liner is between about 12 and about 16 B.T.U./sq. ft./hr./°F.

12. The appliance of claim 11 wherein the rate of heat transfer through the material of which the liner is made is between about 0.75 and about 5.0 B.T.U./sq. ft./hr./°F. in. and the thickness of the liner is between about 0.06 and about 0.15 in.

13. The appliance of claim 11 wherein the rate of heat transfer through the material of which the liner is made is between about 1.1 and about 1.5 B.T.U./sq. ft./hr./°F./in. and the thickness of the liner is between about 0.08 and about 0.10 in.

14. The appliance of claim 13 wherein the heater is in contact with the heat retaining material.

15. The appliance of claim 13 wherein the heater is disposed in the heat retaining material.

16. The appliance of claim 15 wherein the heat retaining material has a melting point between about 170° and about 210° F.

17. The appliance of claim 16 wherein the heat retaining material is a paraffin wax.

18. The appliance of claim 17 further comprising a casing surrounding the tray, the casing having portions defining an opening, the heater comprises electrical terminals extending through the tray, the means for activating the heater comprises an electrical connector attached to an electrical cord, and the terminals are adapted to be removably connected with the connector when the connector is inserted through the opening in the casing.

19. The appliance of claim 18 further comprising a removable cover and the casing and cover enclose the housing.

20. The appliance of claim 10 wherein the heater comprises electrical terminals extending through a selected one of the liner and tray, the means for activating the heater comprises an electrical connector attached to an electrical cord, and the connector is adapted to be removably connected with the terminals.

21. The appliance of claim 10 further comprising a thermostat disposed in the heat retaining material and an indicator operated by the thermostat for indicating to the user when the heat retaining material is heated to a predetermined temperature.

22. The appliance of claim 10 further comprising a casing surrounding the tray, the casing having portions defining an opening, the heater comprises electrical terminals extending through the tray, the means for activating the heater comprises an electrical connector attached to an electrical cord, and the terminals are adapted to be removably connected with the connector when the connector is inserted through the opening in the casing.

23. The appliance of claim 22 wherein the casing further encloses the liner and has portions defining a closable opening through which the product to be heated can be inserted into the appliance.

24. The appliance of claim 22 wherein the casing has sides and a base, the housing is supported in the casing, and the appliance further comprises a removable cover.

25. The appliance of claim 24 wherein the cover and casing fully enclose the housing.

* * * * *